Jan. 25, 1949.　　　　　E. H. LUPTON　　　　　2,460,020
EGG CRATE

Filed Jan. 8, 1945　　　　　　　　　　　7 Sheets-Sheet 1

Inventor
ELMER H. LUPTON.
By Howard J. Whelan
Attorney

Jan. 25, 1949.  E. H. LUPTON  2,460,020
EGG CRATE
Filed Jan. 8, 1945  7 Sheets-Sheet 2
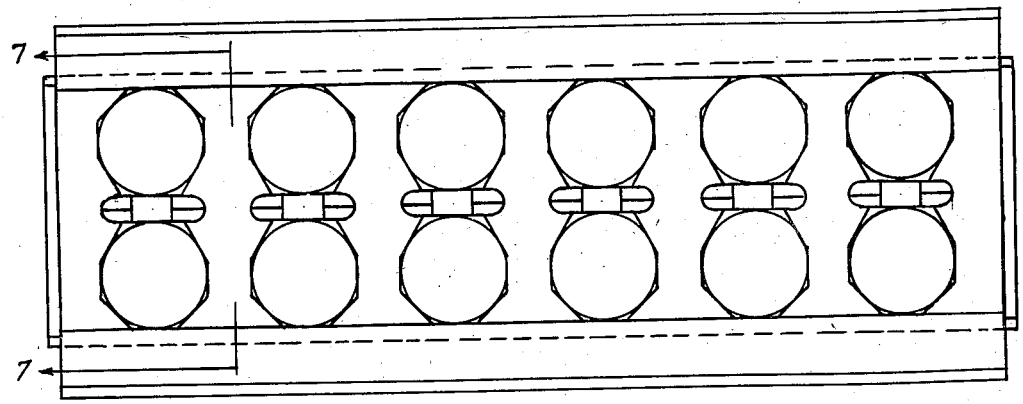
FIG. 5.
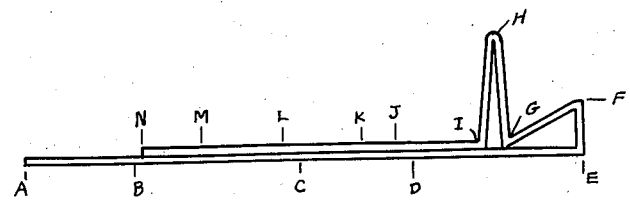
FIG. 11.
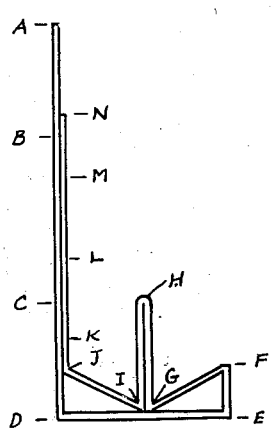
FIG. 12.
FIG. 13.
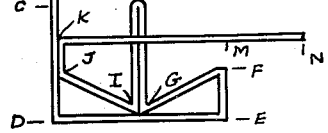
Inventor
ELMER H. LUPTON.
By Howard J. Whelan.
Attorney

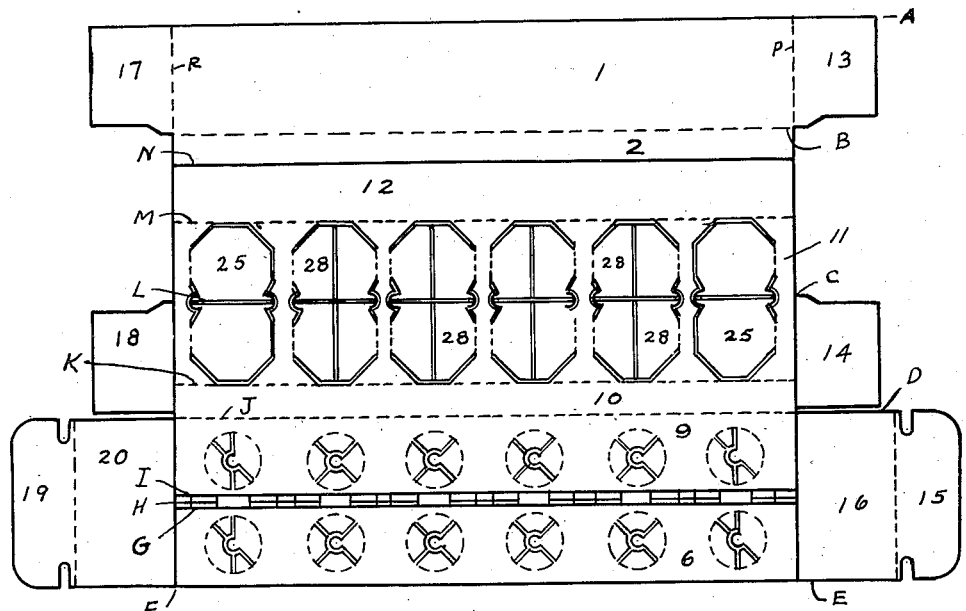
Fig. 9.
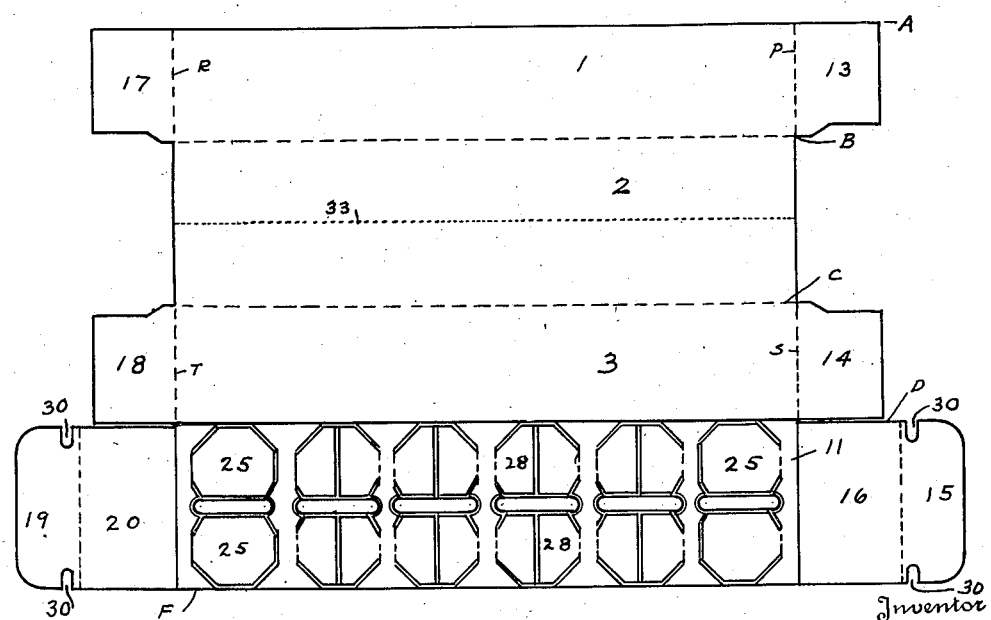
Fig. 10. Elmer H. Lupton.
By Howard J. Whelan.
Attorney Jan. 25, 1949. E. H. LUPTON 2,460,020
EGG CRATE
Filed Jan. 8, 1945 7 Sheets-Sheet 6

Inventor
ELMER H. LUPTON.
By Howard J. Whelan
Attorney

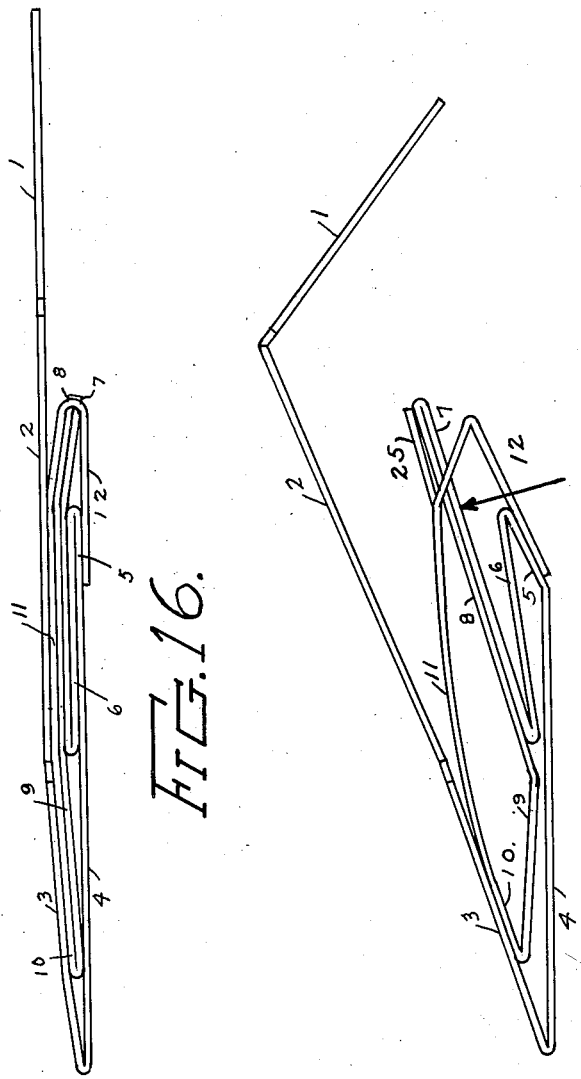

Patented Jan. 25, 1949

2,460,020

UNITED STATES PATENT OFFICE 2,460,020

EGG CRATE

Elmer H. Lupton, Ilchester, Md., assignor to The Bartgis Bros. Company, a corporation of Maryland Application January 8, 1945, Serial No. 571,790

3 Claims. (Cl. 229—29)

This invention refers to portable carriers for unprocessed or natural food and more particularly to an egg crate package.

At the present time cardboard or other flexible material is employed for making crates for holding eggs in quantities of a dozen or so in separate compartments therein in a somewhat loose manner. This permits too much movement in general of the eggs and results in frequently damaging the same and the moistening and unloosening of the package. The piling of the crates on one another is limited or prevented, and this requires more space during transportation and incidentally increases the costs for carrying the products from their source to delivery.

The objects of this invention include the provision of an egg crate of cardboard (or similar flexible material suitable for the purpose) that can be formed out of a single blank, suitably cut, and then bent to make a substantial and effective holder of eggs. Another object is to have the crate formed internally to separate each egg from its neighbors longitudinally and transversely, and resiliently bolster them to prevent undue movement during transportation, at least to an extent that might endanger their condition. A further object is to provide in the blank an arrangement in its construction that would permit its automatic locking when the crate is closed with its contents inside. Still another object is to employ a suspending arrangement for normally keeping the eggs in the crate out of actual contact with the top and bottom panels of the crate. Another object is to provide in the blank an arrangement which will allow the eggs to be removed without loosening the closed container. A further object is to provide an egg crate which must be partially destroyed to extract the eggs from therein to prevent its reuse. Another object is to provide an egg crate which will visually indicate that the package contains its original contents.

Other objects will become apparent as the invention is more fully set forth.

Existing egg crates of this nature are usually in several pieces, consisting in general in a cardboard blank formed into a rectangular or six-sided box of suitable size, with partition pieces of the same material inserted longitudinally and transversely to form cubical compartments to hold the eggs separate from each other. In this invention the crate structure, box, partitions and barriers are formed from a single blank and kept in a single homogeneous sheet before bending. The crate structure is ordinarily kept flat while not in use, and then bent into the crate form for the eggs to be placed therein and then covered up and locked over them. The bending however does not only simply provide partitions but also produces a series of incidental barriers that are suitably cut and perforated, and form bottom, top and side supports for the eggs and a buffer arrangement that serves to keep the eggs spaced resiliently from the top and bottom panels of the crate. The structure can be blanked out in one piece and may be transported flat. It requires little effort to bend it to the assembled form of the crate. It is substantial enough to withstand the customary wear and tear encountered in usage; and it is economical to make and employ for the purposes in question.

In order to explain this invention, a form of the structure that embodies the features of this invention, is shown in the drawings, in which:

Figure 5 is a plan view, with the top opened to remove the eggs,

Figure 3:
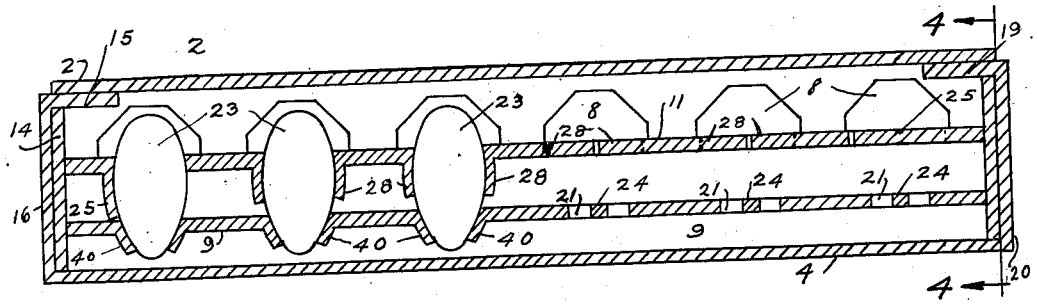
Figure 3 is a sectional view taken along line 3—3 of Figure 1.
Figure 1:
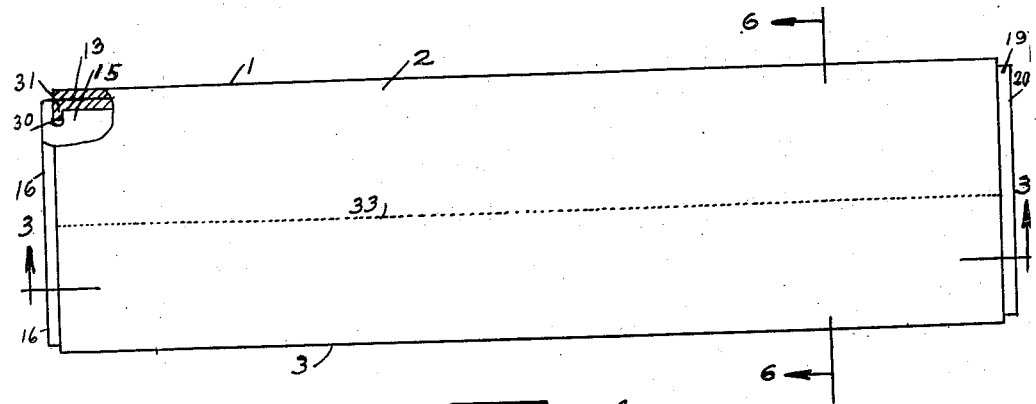
Figure 1 is a plan view of an egg crate, embodying this invention.
Figure 2:
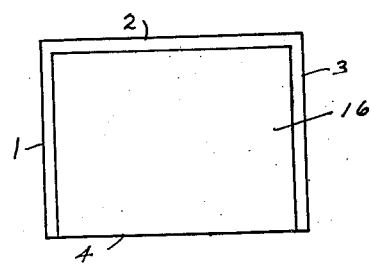
Figure 2 is an end view of Figure 1.
Figure 4:
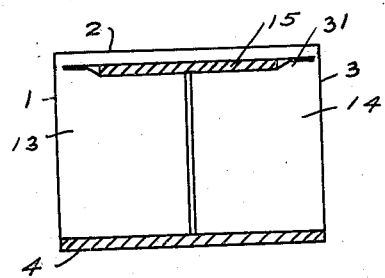
Figure 4 is an end view taken along line 4—4 of Figure 3.
Figure 6:
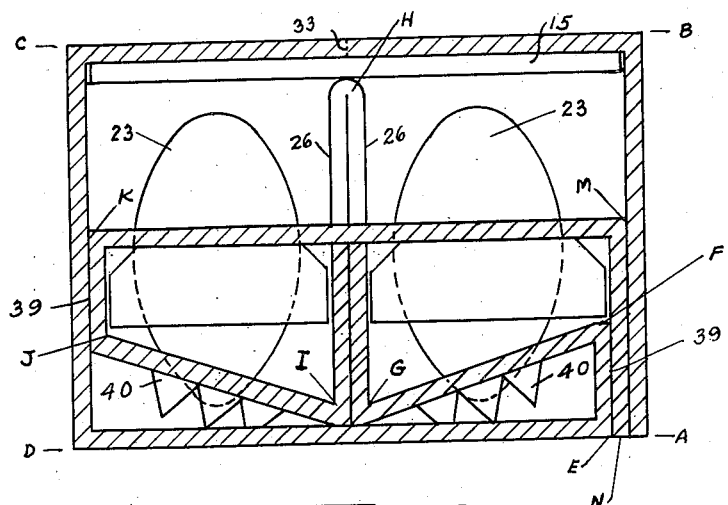
Figure 6 is an enlarged sectional view taken along line 6—6 of Figure 1.
Figure 7:
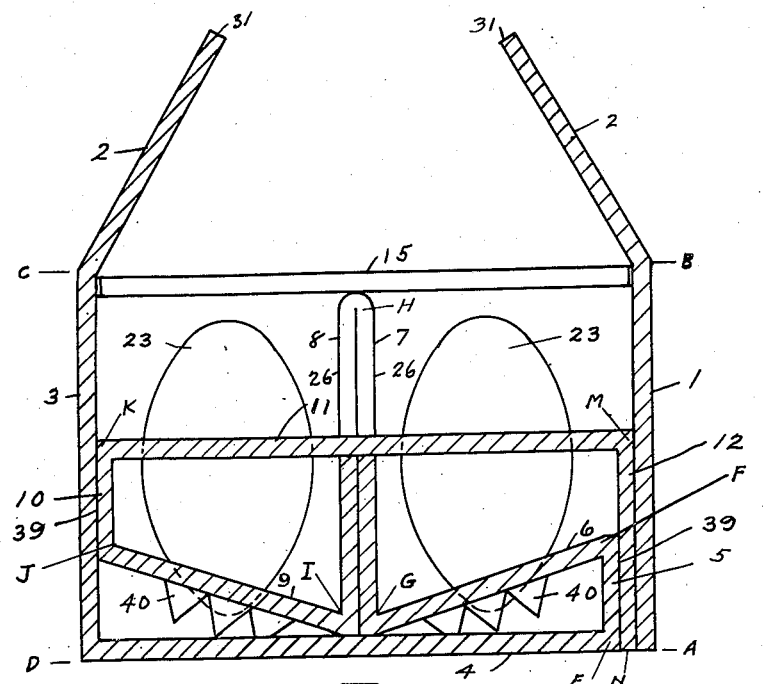
Figure 7 is an enlarged sectional view taken along line 7—7 of Figure 5.
Figure 14:
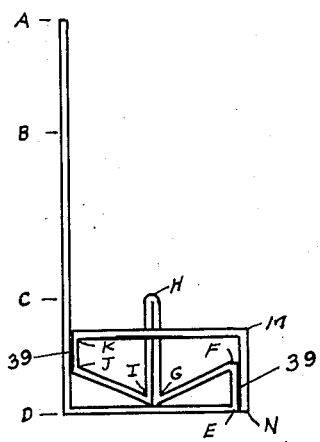
Figure 15:
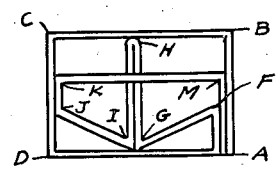
Figure 18:
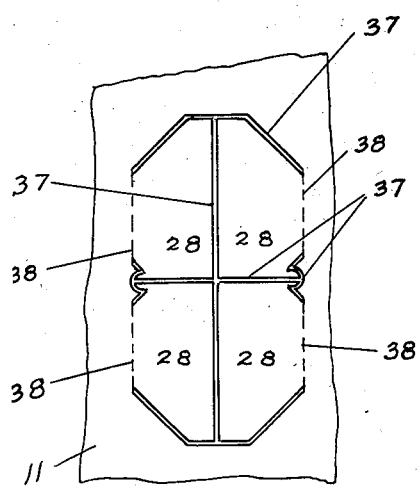
Figure 19:
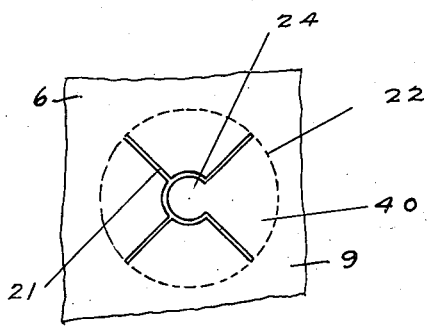

Figure 9 is a plan view of the blank in its first folded position as shown in Figure 11, Figure 10 is a plan view of the blank in its fourth folded position similar to that shown in Figure 14, Figure 11 is a diagrammatic end elevation of the view shown in Figure 9, Figure 12 is a diagrammatic end elevation of the blank in its second folded position, Figure 13 is a diagrammatic end elevation of the blank in its third folded position, Figure 14 is a diagrammatic end elevation of the blank shown in Figure 10, in its fourth folded position, Figure 15 is a diagrammatic end elevation of the blank shown in Figure 6 which is completely folded, with its top in locked and closed position, Figure 16 is an end view of the egg crate collapsed, ready for shipment to the packer, Figure 17 is an end view of the egg crate shown in Figure 16 with pressure being applied to the longitudinal separator in the direction of the arrow to assemble the crate into form for use, Figure 18 is an enlarged view of pieces used to support the upper portion of the egg, and Figure 19 is an enlarged view of the saw toothed arrangement used to support the lower part of the egg.

Similar reference characters refer to similar parts throughout the drawings.

Figure 8:
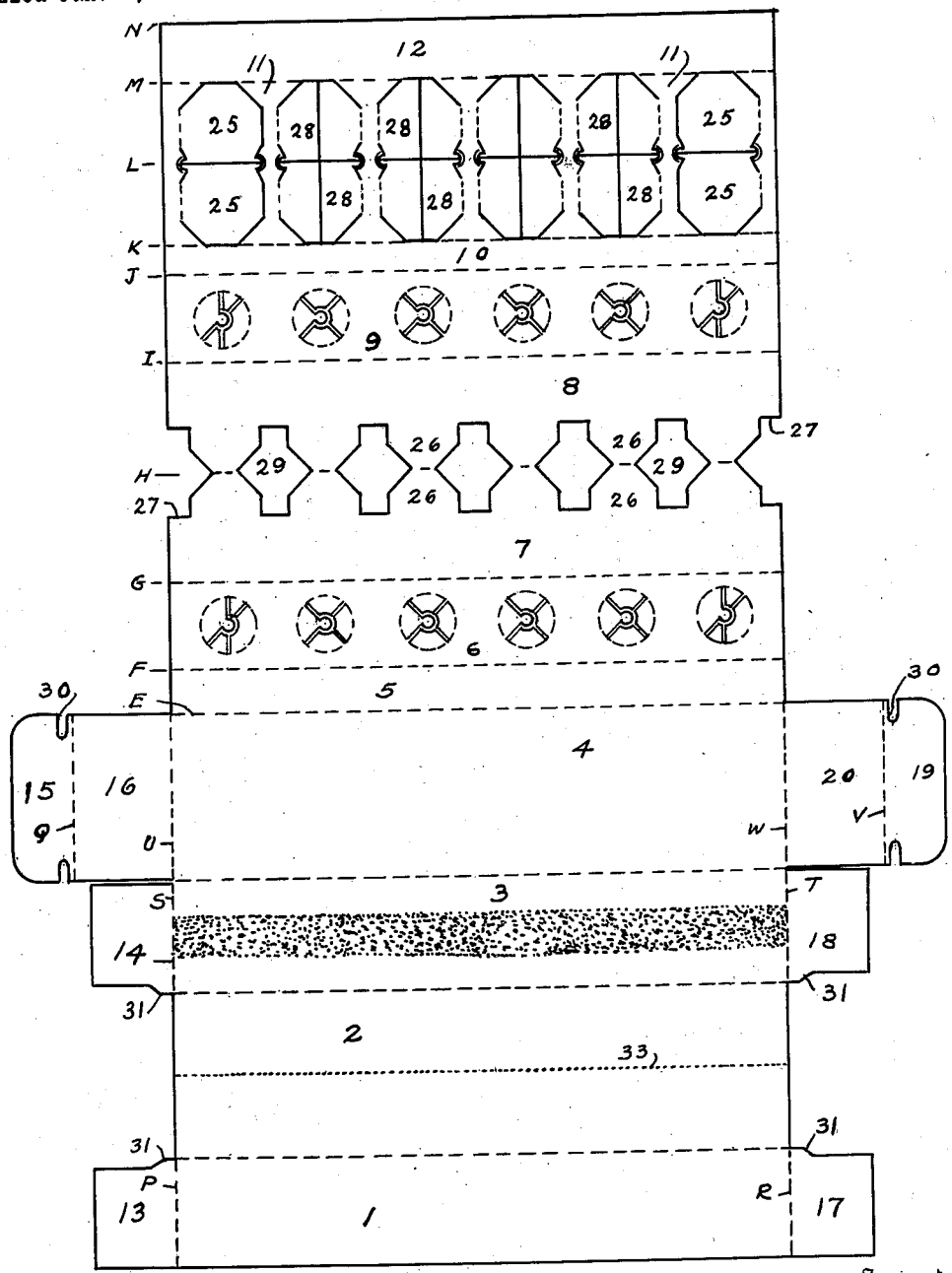
Figure 8 is a plan view of the blank used in forming the box shown in Figure 1.

A blank of cardboard or similar material is cut in the form indicated in Figure 8, and impressed to produce easy bends at the dotted lines B, C, D, E, F, G, H, I, J, K, L, and M. The lines A and N designate the end lines. The lines are transversely arranged over the blank and serve as the boundaries of the various panels 1, 2, 3, 4, 5, 6, 7, 8, 9, 10, 11 and 12. The bend lines running longitudinally are Q, S, T and V. The lines P, R, U and W are the tranverse end lines. These act as boundaries to the panels 13, 14, 15, 16, 17, 18, 19 and 20 as indicated.

In the panels 6 and 9 are provided the diagonal cross-line cuts 21 with bend lines 22 at their circumference lines to enable them to be bent under and form a saw-tooth arrangement 40 of columns resting on the bottom panel of the folded crate. The arrangement serves to provide a support under the inserted eggs 23 and keep them from resting directly on the bottom panel 4. This crate will take twelve eggs, arranged in two rows of six each. The central portions 24 are left attached to one of the saw-tooth pieces.

The upper portion of the eggs are held between the pieces 25 formed in quasi-quadrilateral form and bendable downwardly in the crate to form the end partitions to hold the eggs at both ends of the crate. They closely fit against the sides 26 of the cutouts 27 and make a rigid structure at their locations. The pieces 28 likewise fit against their respective sides 26, numbered 7 and 8 and are held at the edges of same. Holes 29 in the blank form shelves on which the panels 11 rest. The pieces 25 and 28 are provided with line cuts 37 and bend lines 38.

In the diagrammatic arrangement of the bending of the blank shown in the drawings, Figure 11 shows the manner in which the preliminary bending proceeds, the lettering serves to identify the bends and the ends of the material. The letters A to N inclusive are indicated at the proximate position of the various bend lines to illustrate their relative positions.

Figures 12, 13, 14 and 15 show the sequence of bending. Thus in Figure 12 the bend takes place so that A—D becomes vertical, as well as J—N. At the same time I—J and F—G become angular and serve as the bottom supports for the eggs inserted in the crate. The saw-tooth elements are bent downwardly to act as resilient columns and braces underneath. In Figure 13, the bending progresses and the portion K—N is bent over horizontally to form a middle barrier for the crate. This gives it rigidity, serves to keep the eggs in proper alignment and locks the bent apexed portions I—H and G—H in a vertical position with the sides engaging under the K—M parts to form a support on which the latter can rest horizontally. In Figure 14 the outer lip or panel M—N is bent down against the side E—F and closes the crate for the insertion of the eggs therein. In Figure 15 the cover formed from the panels C—B; and B—A is bent over to complete the crate with the eggs enclosed therein. It rests on the apexed location at H. The crate is relatively rigid because the cross structure formed by the middle barrier strengthens it in one direction, which the apexed partition I and G—H act in a direction across its middle at right angles.

The panels 13, 14, 17 and 18 are bent up in a conventional manner to close up the ends of the crate, and the panels 15, 16, 19 and 20 cover the latter, lock through the use of the slots 30 in coordination with the projections 31 formed on the panels 13, 14, 17 and 18 as indicated in Figure 8. The top panel 2 of the closed crate, has perforations 33 to permit the opening up of the cover when it is desired to remove the eggs by the customers. This separation and discarding of part of the cover upon opening of the crate by the customer prevents the crate's reuse. It is preferable to use some fastening material such as glue or staples 39 at the locations external to E—F and J—K. The other figures indicate the construction of the parts and their position in assembling, and seem to require no further description to show their relative positions and function in the device.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims.

Having thus described the invention, what is claimed is:

1. A crate of the class described comprising a single blank of flexible material of quasi-rectangular form having twelve panels arranged longitudinally therein between bend lines and the end edges, with its first panel having extensions provided at each end for forming the ends of a crate, said first panel being bent to form an outer side wall, the second panel being bent on said first panel to provide a top cover, the third panel being similar in shape to the first panel and bent downwardly to form an opposite side panel, the fourth panel having extensions provided at each end for forming ends and locking means therefor, said fourth panel being bent at right angles to the side panel to form the bottom therefor, the fifth panel being bent upwardly at right angles to the bottom to form a short inner panel aligned parallel with said first side panel, the sixth panel being bent downwardly and outwardly to contact the floor and rest thereon, the seventh panel being bent vertically upwardly to contact and pass through said top panel, then bent downwardly to form panel eight until it contacts and rests on the floor thence being bent upwardly and outwardly forming panel nine, thence bent upwardly forming panel ten which is parallel with the side panel three for approximately one-half its distance, thence bent horizontally to form panel eleven and continue across the entire crate until it contacts side panel one, thence projecting downwardly between said side panel one and short inner panel five.

2. A crate of the class described comprising a single blank of flexible material of quasi-rectangular form having twelve panels arranged longitudinally therein between bend lines and the end edges, with its first panel having extensions provided at each end for forming the ends of a crate, said first panel being bent to form an outer side wall, the second panel being bent on said first panel to provide a top cover, the third panel being similar in shape to the first panel and bent downwardly to form an opposite side panel, the fourth panel having extensions provided at each end for forming ends and locking means therefor, said fourth panel being bent at right angles to the side panel to form the bottom therefor, the fifth panel being bent upwardly at right angles to the bottom to form short inner panel aligned parallel with said first side panel, the sixth panel being bent downwardly and outwardly to contact the floor and rest thereon, the seventh panel being bent vertically upwardly to contact and pass through said top panel, then bent downwardly to form panel eight until it contacts and rests on the floor thence being bent upwardly and outwardly forming panel nine, thence bent upwardly forming panel ten which is parallel with the side panel three for approximately one-half its distance, thence bent horizontally to form panel eleven and continue across the entire crate until it contacts side panel one, thence projecting downwardly between said side panel one and short inner panel five, said panel eleven provided with semi-quadrilateral pieces cut along their outside edges and through the center to allow the panels seven and eight to project up therethrough and form a support therefor, and provide means for peripherally encasing the upper portion of an egg and retaining same in a downward position against said panels six and seven.

3. A crate of the class described comprising a single blank of flexible material of quasi-rectangular form having a plurality of panels arranged longitudinally therein between bend lines and the end edges, with its first panel having extensions provided at each end for forming the ends of a crate, said first panel being bent to form an outer side wall, the second panel being bent on said first panel to provide a top cover, the third panel being similar in shape to the first panel and bent downwardly to form an opposite side panel, the fourth panel having extensions provided at each end for forming ends and locking means therefor, said fourth panel being bent at right angles to the side panel to form the bottom therefor, the fifth panel being bent upwardly at right angles to the bottom to form short inner panel aligned parallel with said first side panel, the sixth panel being bent downwardly and outwardly to contact the floor and rest thereon, the seventh panel being bent vertically upwardly to contact and pass through said top panel, then bent downwardly to form panel eight until it contacts and rests on the floor thence being bent upwardly and outwardly forming panel nine, thence bent upwardly forming panel ten which is parallel with the side panel three for approximately one-half its distance, thence bent horizontally to form panel eleven and continuing across the crate until it contacts said panel one, thence projecting downwardly between said panel one and short inner panel five, said panel eleven being provided with semi-quadrilateral pieces out along their outer edges and through the center to allow the panels seven and eight to project up therethrough and form a support therefor, means for peripherally encasing the upper portion of an egg and retaining same in a downward position against said panel six, and seven, and diagonal serrations provided in said panels six and nine to cushion and suspend the bottom of the eggs placed therein above the floor portion of said crate to protect same against breakage.

ELMER H. LUPTON.

REFERENCES CITED

The following references are of record in the file of this patent:

UNITED STATES PATENTS

| Number | Name | Date |
|---|---|---|
| 688,421 | Keys | Dec. 10, 1901 |
| 1,836,100 | McWilliams | Dec. 15, 1931 |
| 1,980,597 | Reich | Nov. 13, 1934 |
| 2,130,378 | Bueschel | Sept. 20, 1938 |
| 2,152,649 | Jones | Apr. 4, 1939 |
| 2,333,181 | Inman | Nov. 2, 1943 |
| 2,374,382 | Rutledge | Apr. 24, 1945 |